United States Patent [19]

Hilaire

[11] 4,346,811
[45] Aug. 31, 1982

[54] PILFER-PROOF CLOSURE CAP OF PLASTIC MATERIAL

[75] Inventor: Fernand Hilaire, Monte Carlo, Monaco

[73] Assignee: Captocap Limited, Vaduz, Liechtenstein

[21] Appl. No.: 18,789

[22] Filed: Mar. 8, 1979

[30] Foreign Application Priority Data

Mar. 28, 1978 [FR] France ............................ 78 08912

[51] Int. Cl.³ .............................................. B65D 41/34
[52] U.S. Cl. .................................................... 215/252
[58] Field of Search ........................................ 215/252

[56] References Cited

U.S. PATENT DOCUMENTS

| 3,329,295 | 7/1967 | Fields | 215/252 |
| 3,455,478 | 7/1969 | Fields | 215/252 |
| 3,673,761 | 7/1972 | Leitz | 215/252 X |
| 3,737,064 | 6/1973 | Patel | 215/252 |
| 3,980,195 | 9/1976 | Fillmore | 215/252 X |
| 4,062,466 | 12/1977 | Conti | 215/252 |
| 4,126,240 | 11/1978 | Brach | 215/252 |
| 4,156,490 | 5/1979 | Peraboni | 215/252 |
| 4,196,818 | 4/1980 | Brownbill | 215/252 |

FOREIGN PATENT DOCUMENTS 553475 2/1958 Canada ............................. 215/252

Primary Examiner—Donald F. Norton
Attorney, Agent, or Firm—Young & Thompson

[57] ABSTRACT

An internally threaded cap shell is screwed on the neck of a container such as a bottle of the type used for pharmaceutical products and the like. A ring is joined to the cap shell by means of plastic connecting bridges which are concealed by a downward extension of the cap in the form of a projecting annular flange. The ring and the bridges are located substantially in the line of extension of the side wall of the cap shell and the free end of the ring has a rib which is applied under an annular projection of the bottle neck.

2 Claims, 14 Drawing Figures

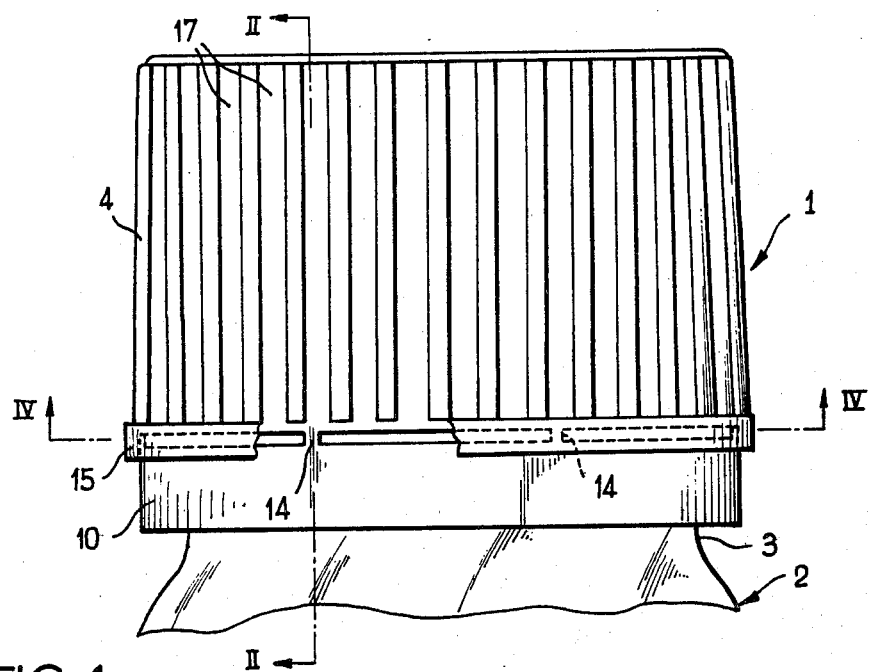
FIG_1
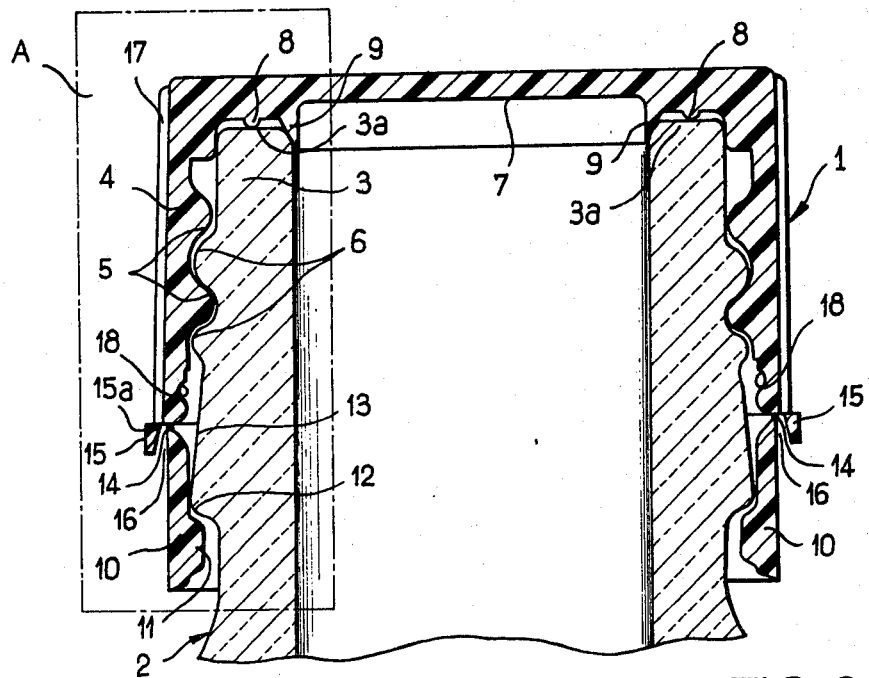
FIG_2

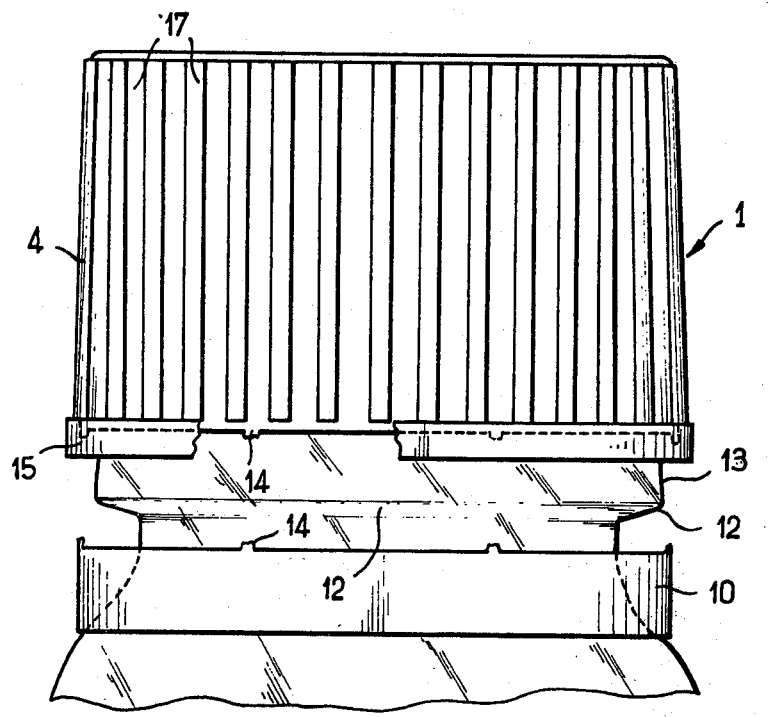
FIG_3
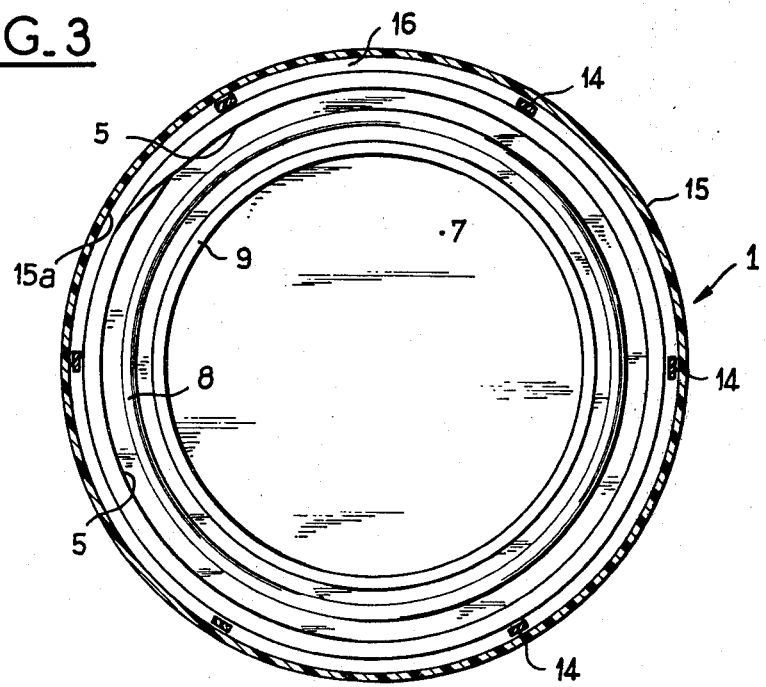
FIG_4

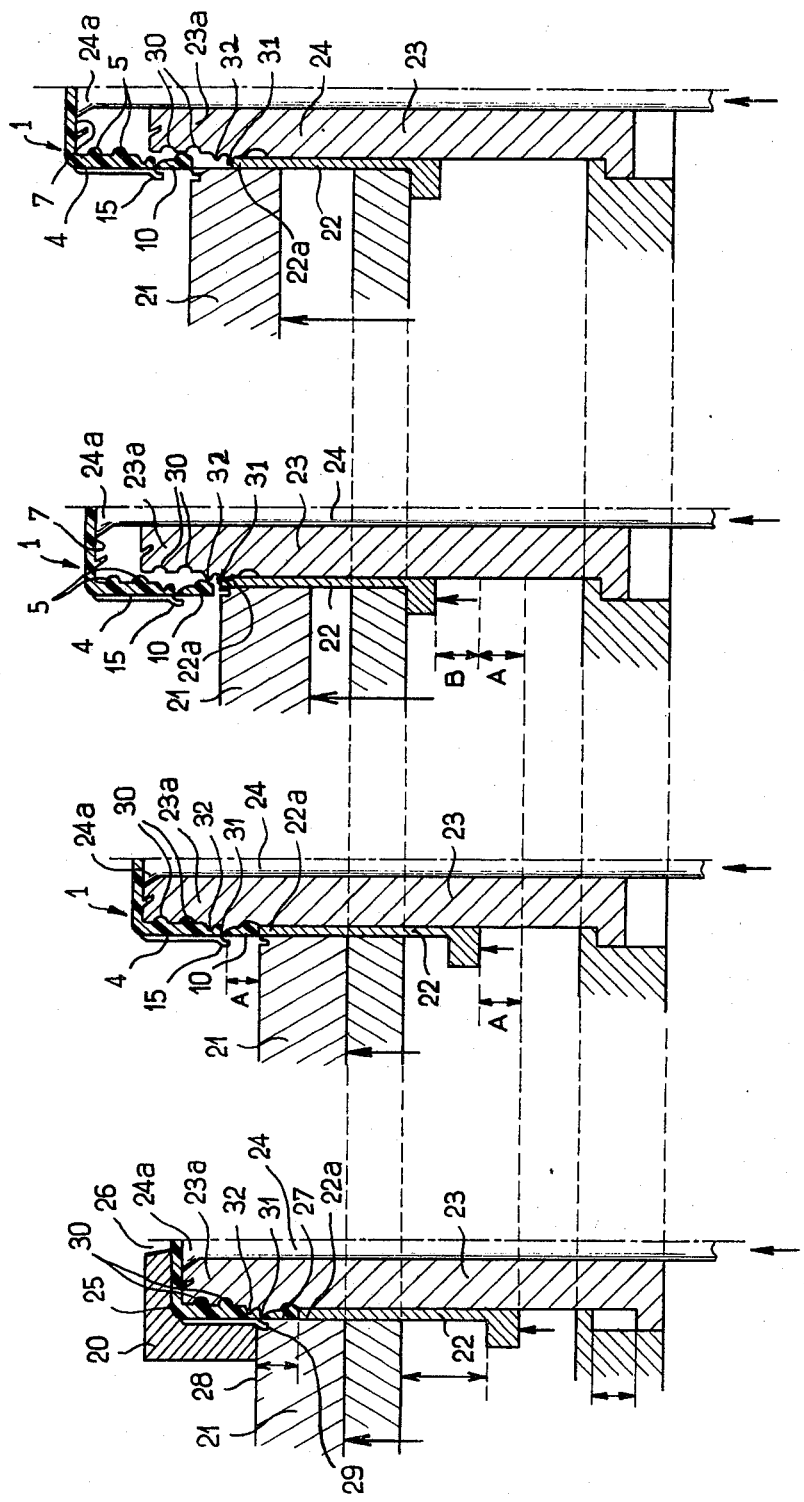

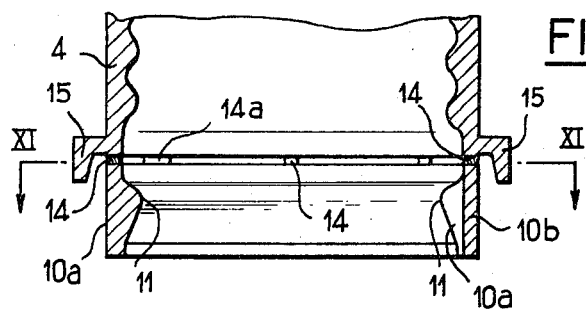
FIG._10
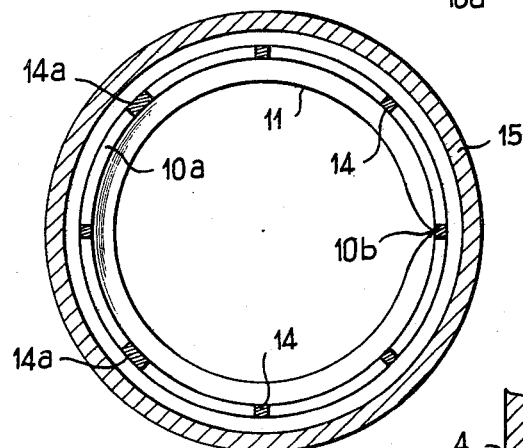
FIG._11
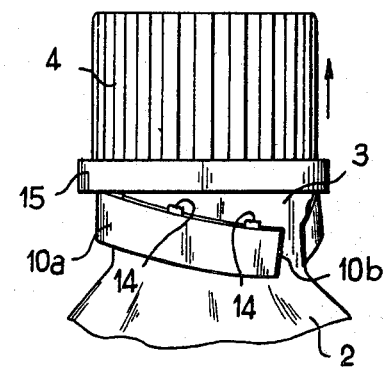
FIG._12
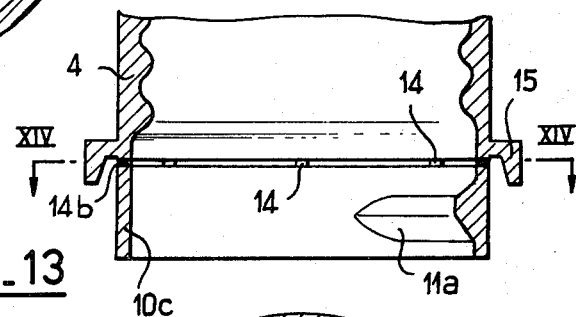
FIG._13
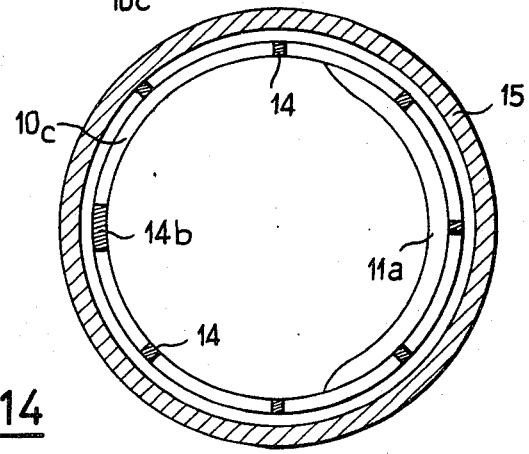
FIG._14

PILFER-PROOF CLOSURE CAP OF PLASTIC MATERIAL

This invention relates to a pilfer-proof closure cap of plastic material for sealing containers of various types such as bottles which are intended to contain pharmaceutical products.

The invention is also directed to a mold for the fabrication of the closure cap aforementioned.

Pilfer-proof closure caps of plastic material such as polyethylene or polyvinyl chloride or of metal such as aluminum are already known.

In some types of closure cap, the cap is designed in the form of an internally threaded shell which is intended to be screwed on the neck of the container. The end wall of said cap shell is provided with means such as a flexible annular tongue in order to form a tight seal with the neck of the container.

In a closure cap of this type, the shell has an extension in the form of a ring, there being formed on the free end of said ring an annular rib which is intended to engage beneath an annular projection formed on the neck of the container.

In addition, provision is made between the cap shell and the ring for two series of peripheral openings or circular lines of reduced wall thickness for delimiting a guarantee strip which is intended to be torn-off before opening the closure cap.

Opening of the cap cannot be effected without tearing-off said guarantee strip by reason of the fact that the ring of the cap is retained by means of its rib beneath the projecting portion of the neck of the container. Said guarantee strip consequently ensures that the cap is fully protected against pilferage from the moment this latter is applied on the container to the time of opening of the cap for utilization of the contents of the container by the user.

After tearing-off the guarantee strip, the closure cap is divided into two sections, namely the ring and the internally threaded cap shell. Once it has been freed from the ring which remains in place on the neck of the container, said ring can then be unscrewed.

Experience has shown that this tearable guarantee strip did not prove wholly satisfactory as a means for ensuring pilfer-proof sealing of the cap.

On the one hand, a guarantee strip of this type considerably complicates the manufacture of the closure cap.

On the other hand, the operation which consists in tearing-off the guarantee strip calls for a certain degree of manual dexterity on the part of the user. Should this operation be clumsily executed, the guarantee strip is incompletely torn-off, in which case it becomes very difficult to detach the shell from the ring or else the shell itself is torn and in this case can no longer be used for closing the container.

Moreover, the user's finger-nails are liable to be damaged if the guarantee strip is unskilfully handled.

Finally, once the guarantee strip has been removed, traces of tearing necessarily remain on the cap shell, thus impairing the attractive appearance of the closure cap.

A type of cap which is also known is composed of an internally threaded shell which is intended to be screwed on the neck of a bottle and of a ring which is intended to be applied beneath an annular projection formed on the neck of the bottle. Said ring is joined to the shell by means of bridges of plastic material which are designed to tear-off at the time of unscrewing of the cap. Said bridges are located at the same level as the bearing surface of the ring and extend outwards from said ring substantially in a radial direction. Under these conditions, the bridges must entirely withstand the forces produced at the time of placing of the cap on the bottle. Consequently, said bridges must be of sufficiently high strength, thus suffering from a disadvantage in that they cannot be readily torn-off at the time of unscrewing of the cap.

The aim of this invention is to overcome the drawbacks of the designs mentioned above by producing a pilfer-proof closure cap formed in a single piece and provided with guarantee means which can readily be torn-off at the time of unscrewing of the cap without, however, being attended by any danger of unintentional tearing, for example at the time of placing of the cap on the container.

In accordance with the invention, the closure cap of plastic material comprises an internally threaded shell to be screwed on the neck of the container and a ring to be applied beneath an annular projection formed on the neck of said container, said ring being joined to the shell by means of bridges of plastic material designed to tear-off at the time of unscrewing of the cap. Said closure cap is distinguished by the fact that the ring and the bridges are located substantially in the line of extension of the lateral wall of the cap shell and that the free end of the ring has an annular rib which is intended to be applied beneath said annular projection of the neck of the container.

When the cap is engaged on the neck of the container, the free end of the ring expands and passes over the annular projection of the container neck. By reason of the fact that the rib of the ring is located at a certain distance from the bridges, the expansion of the free end of the ring has practically no consequential effect on the bridges. Said bridges can therefore have a relatively small cross-sectional area and can readily be torn-off at the time of unscrewing of the cap without, however, being damaged at the time of handling operations performed when placing the cap on the neck of the container.

Thus the bridges of plastic material can for example be of smaller thickness than the lateral wall of the cap shell and of the ring.

In an advantageous embodiment of the invention, the closure cap is made of polypropylene. It is known that this is a relatively rigid plastic. On account of this rigidity, the use of this type of material proved impossible for the fabrication of a closure cap having a tearable guarantee strip. However, the use of polypropylene is advantageous by reason of the fact that parts having highly accurate dimensions can be obtained by molding, which is conducive to leak-tightness of the cap. Moreover, polypropylene is sterilizable, which is highly advantageous in the pharmaceutical applications of the closure cap in accordance with the invention.

In a preferred embodiment of the closure cap in accordance with the invention, provision is made for an annular space of sufficient width between the annular flange and the bridges in order to permit expansion of the ring at the time of engagement of the annular rib of the ring on the annular projection of the neck of the container. Said annular flange conceals the bridges while at the same time constituting a stop for limiting expansion of the ring, thereby preventing unintentional rupture of the bridges.

The invention is also directed to a mold for the fabrication of the closure cap in accordance with the invention.

Said mold comprises a die having an internal cavity corresponding to the external surface of the shell of the cap to be molded, an ejection plate having a bore corresponding to the external surface of the cap ring, an ejection sleeve slidably mounted within said bore and a core slidably fitted within said sleeve, the internal impression of the cap to be molded being formed in the upper portion of the core. Said core is traversed axially by a push-up plunger, the head of which is intended to be applied against the end wall of the cap to be molded.

The mold aforesaid is distinguished by the fact that the core is provided on the rearward side of the grooves corresponding to the internal thread of the shell and on the forward side of the reverse draw-taper corresponding to the bridges, a projecting annular rib being designed to hold the cap shell away from the surface of the core under the action of the thrust exerted on the end of the ring by the ejection sleeve.

This arrangement makes it possible to prevent rupture of the bridges at the time of removal of the cap from the mold.

Further properties and advantages of the invention will become apparent from the following description, reference being made to the accompanying drawings which are given by way of example without any limitation being implied, and in which:

FIG. 1 is a fragmentary view in elevation showing a closure cap in accordance with the invention, said cap being mounted on a bottle;

FIG. 2 is a sectional view taken along the plane II—II of FIG. 1;

FIG. 3 is similar to the view of FIG. 1 and is taken after tearing-off the bridges which join the lower ring to the upper shell;

FIG. 4 is a sectional view taken along the plane IV—IV of FIG. 1 after removal of the bottle;

FIGS. 5 to 8 are diagrammatic longitudinal half-sectional views of a mold in accordance with the invention and corresponding to the different stages of operation of said mold;

FIG. 10 is a fragmentary longitudinal sectional view of an alternative embodiment of the closure cap in accordance with the invention;

FIG. 11 is a sectional view taken along the plane XI—XI of FIG. 10;

FIG. 12 is a front view of the closure cap shown in FIGS. 10 and 11, the ring having been torn-off;

FIG. 13 is a view which is similar to FIG. 10 and relates to another alternative embodiment;

FIG. 14 is a sectional view taken along the plane XIV—XIV of FIG. 13.

Figure 9:
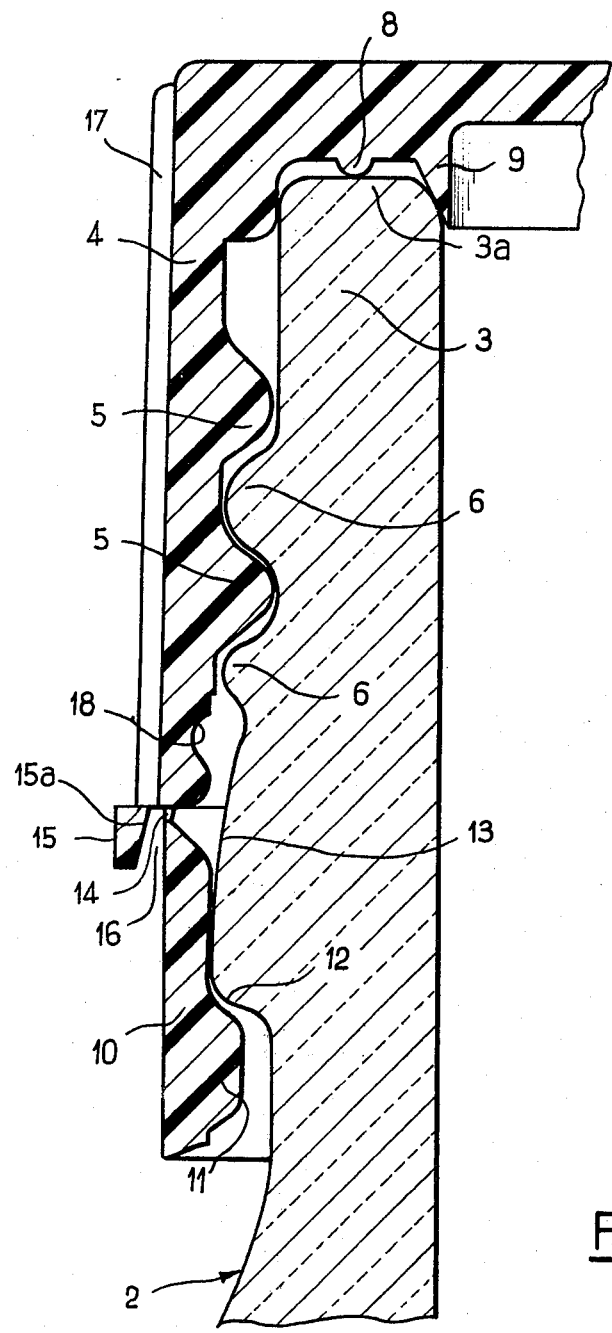
FIG. 9 is a greatly enlarged longitudinal sectional view of portion A of FIG. 2.

In the embodiment of FIGS. 1 to 14, the pilfer-proof closure cap 1 in accordance with the invention is fabricated from a relatively rigid plastic material such as polypropylene and is assumed to be mounted on the neck 3 of a bottle 2 containing a pharmaceutical product, for example.

Said cap 1 comprises a shell 4, and internally threaded lateral face 5 (shown in FIGS. 2 and 9) of which is screwed on the external threads 6 formed on the neck 3 of the bottle 2. The end wall 7 of the cap shell 4 is hermetically applied against the bottle neck 3 by means of a circular rib 8 which bears substantially on the center of the top end face 3a of the neck 3 and by means of a relatively flexible tongue 9 which is applied laterally against the end face 3a of said bottle neck.

The cap shell 4 has a downward extension in the form of a ring 10, the free end of which is provided with an internal annular rib 11 applied beneath an annular projection 12 which is formed below the threads 6 of the bottle neck 3. Between the threads 6 and said projection 12, the neck 3 has a frusto-conical surface 13, the diameter of which increases in the downward direction.

The cap shell 4 is joined to the ring 10 by means of a series of bridges 14 disposed at uniform intervals around the closure cap (as shown in particular in FIG. 4). Said bridges 14 are molded at the same time as the complete closure cap 1 and are of smaller thickness than the lateral wall of this latter in order that they may be torn-off at the time of unscrewing of the cap 1. Moreover, said bridges 14 are surrounded externally by an annular flange 15 which is joined to the cap shell 4. Said annular flange 15 conceals the bridges 14.

As shown in FIGS. 2 and 9, the annular flange 15 defines between this latter and the bridges 14 an annular space 16 of sufficient width to permit outward expansion of the ring 10 at the time of engagement of this latter on the annular projection 12 of the bottle neck 3 at the moment of screwing of the closure cap 1.

Moreover, the internal face 15a of the annular flange 15 constitutes a stop for limiting the outward expansion of the ring 10 in order to prevent rupture of the bridges 14.

It is further apparent from FIGS. 1 and 3 that the cap shell 4 is provided on its external lateral face with longitudinal splines 17 which constitute a friction surface for enabling the user to grip the closure cap 1. The annular flange 15 forms a projection with respect to said friction surface in order to prevent the user's fingers from being applied on the cap 1 below the shell 4 since this would make it impossible to unscrew the cap.

As also shown in FIGS. 2 and 9, the internal face of the shell 4 is provided with an annular groove 18 formed between the threaded portion 5 and the tearable bridges 14. The design function of said groove 18 will be explained hereinafter in the description relating to the mold in accordance with the invention.

Placing of the closure cap in accordance with the invention on the neck 3 of the bottle 2 is performed as follows (with reference to FIGS. 2 and 9):

The closure cap 1 is engaged on the neck 3. At this moment, the first thread 5 of the cap shell 4 is in contact with the corresponding thread 6 of the neck 3 and the internal rib 11 of the ring 10 touches the frusto-conical surface 13 of the neck 3. It is then only necessary to screw-on the shell 4 by applying a light pressure towards the neck 3 in order to enable the ring 10 to slide over the frusto-conical surface 13 up to the projection 12 of the neck 3. This movement results in a slight outward expansion of the ring 10 produced by a slight elastic deformation of the thinnest portion of the plastic material, namely at the level of the bridges 14. This expansion is limited in the outward direction by the internal face 15a of the annular flange 15, thus preventing accidental rupture of the bridges 14.

When the cap has been tightly screwed down, the rib 11 of the ring 10 is resiliently applied under the annular projection 12 of the neck 3, the rib 8 and the annular tongue 9 are applied on the top end face 3a of said neck 3, thus ensuring the requisite degree of leak-tightness.

Unscrewing of the cap 1 prior to initial use of the bottle 2 is performed quite naturally by exerting a sufficiently high torque on the cap shell 4 to tear the bridges 14 which join said shell 4 to the ring 10. This movement tends to apply the rib 11 of the ring 10 against the projection 12 of the neck 3, thus preventing said ring 10 from rotating about the neck 3 at the same time as the shell 4.

When the bridges 14 have been torn-off, the shell 4 is freed from the ring 10 which remains in position on the neck 3 of the bottle 2 as shown in FIG. 3.

Unscrewing of the cap shell 4 is thus carried out freely. After initial use of the bottle 2, the shell 4 can be used again as a conventional screw cap.

It is therefore apparent that a closure cap in accordance with the invention cannot be opened without tearing the bridges 14 which join the cap shell 4 to the ring 10. Furthermore, the annular flange 15 serves to conceal said bridges 14, with the result that any user with dishonest motives does not, a priori, suspect the pilfer-proof character of the closure cap.

The fact that the ring 10 remains in position on the neck 3 of the bottle 2 permits optical checking of any unauthorized opening of the closure cap.

Fabrication of the closure cap in accordance with the invention is performed by means of a mold constituting an adaptation of the mold described in French Pat. No. 2 261 937 in the name of the present Applicant.

As shown in FIGS. 5 to 8, said mold comprises a die 20, an ejection plate 21, an ejection sleeve 22, a core 23, a push-up plunger 24 and means (not shown) for controlling the relative displacement of these different components.

The die 20 has an internal cavity 25 corresponding to the external surface of the shell 4 of the closure cap to be molded. Said die 20 also has a central orifice 26 for the injection of plastic material.

The ejection plate 21 is provided with a central bore 27 corresponding to the external surface of the ring 10 of the cap to be molded. Said ejection plate 21 is also provided on that face 28 which is adjacent to the die 20 with an annular groove 29 corresponding to the profile of the annular flange 15 of the cap to be molded.

Within the bore 27 of the ejection plate 21 is slidably mounted the ejection sleeve 22, the upper end 22a of which corresponds to the free end of the cap ring 10. Said sleeve 22 is in turn traversed axially by the core 23, the upper portion 23a of which is provided with the internal impression of the cap to be molded. Said core 23 is also traversed axially by the push-up plunger 24, the head 24a of which is intended to be applied against the end wall 7 of the cap to be molded.

In accordance with a preferred embodiment of the invention, the core 23 is provided with an annular projecting rib 32 on the rearward side of the grooves 30 corresponding to the internal threads 5 of the shell 4 of the cap to be molded and on the forward side of the annular reverse draw-taper 31 which corresponds to the bridges 14. The design function of said projecting rib 32 will hereinafter be explained in detail.

The fabrication of closure caps in accordance with the invention by means of the mold shown in FIGS. 5 to 8 is performed as follows:

plastic material is injected through the orifice 26 of the die 20 whilst the mold is in the molding position as shown in FIG. 5;

when the plastic material has been allowed to harden, the die 20 is withdrawn and delivery from the mold or "take-out" is then begun. The take-out operation is performed in three successive steps:

(a) in a first step (shown in FIG. 6), the ejection sleeve 22, the core 23 and the push-up plunger 24 are thrust upwards over a distance of travel A corresponding to the height of the cap ring 10. Said ring 10 is thus freed from the ejection plate 21.

(b) in a second step (shown in FIG. 7), the core 23 remains stationary and the sleeve 22, the plunger 24 as well as the ejection plate 21 are thrust upwards over a distance of travel B. The closure cap 1 is separated from the core 23. Between the first step and the second step mentioned above, the annular rib 32 of the core 23 moves the cap shell 4 away from the internal impression 23a of said core, thus outwardly disengaging the bridges 14 from the corresponding reverse draw-taper 31 of the core 23. This accordingly prevents any excessive deformation of the ring 10 at the level of the bridges 14 which would otherwise be liable to cause rupture of said bridges.

(c) in the final stage (shown in FIG. 8), the ejection sleeve 22 remains stationary and the ejection plate 21 as well as the push-up plunger 24 continue to travel upwards, thus completely freeing the cap 1.

As can readily be understood, the three steps described in the foregoing are carried out continuously and over a very short period of time.

The mold in accordance with the invention, the operation of which has just been described, is wholly suited to molding of a relatively rigid plastic material such as polypropylene while avoiding any danger of rupture of the closure cap bridges 14.

As will be readily apparent, the invention is not limited to the examples hereinabove described and a large number of modifications can accordingly be contemplated without thereby departing either from the scope or the spirit of the invention.

From this it follows that the pilfer-proof closure cap in accordance with the invention can also be fabricated from a plastic material which has lower rigidity than polypropylene provided that the dimensions of the bridges 14 are adapted to the mechanical properties of said plastic material.

The sealing means of the closure cap 1 can be different from the rib 8 and the annular tongue 9 formed on the end wall 7 of the cap.

Moreover, the annular flange 15 could be extended to the base of the closure cap in order to cover the ring 10 completely.

In the event that the container 2 is intended to be re-used and returned to the manufacturer, it is an advantage to ensure that the ring 10 can readily be removed from the neck 3 of the container 2.

In the embodiment of FIGS. 10 and 11, the ring 10a is accordingly provided in the vertical direction with a tearable portion of reduced thickness 10b. In addition, two bridges 14a of larger cross-sectional area than the other bridges 14 are disposed substantially opposite to the thinned portion 10b.

As shown in FIG. 12, initial unscrewing of the closure cap results in rupture of the small-section bridges 14 as well as the thinned portion 10b The cap can then be completely unscrewed. The ring 10 which is torn at the level of its thinned portion 10b remains attached to the cap by means of the two bridges 14a.

In the embodiment shown in FIGS. 13 and 14, the ring 10c has a rib 11a which extends over less than one-half and preferably through an angle of 120° to 160° of the circumference of said ring. In addition, a bridge 14b having a larger cross-sectional area than the other bridges 14 is placed opposite to the rib 11a.

At the time of unscrewing of the closure cap, the small-section bridges 14 are torn as in the previous instance. After complete unscrewing of the cap, the ring 10c can simply be freed by inclining the cap to a slight extent so as to free the rib 11a from the annular projection 12 of the container 2. The ring 10c remains attached to the cap by means of the large-section bridge 14b.

We claim:

1. A pilfer-proof closure cap of plastic material for sealing a container having a threaded neck portion, said closure cap comprising an internally threaded shell to be screwed on the neck of the container and a ring to be applied beneath an annular projection formed on the neck of the container, said ring being joined to the shell by means of bridges of plastic material designed to tear-off at the time of unscrewing of the cap, said ring having a free end which has a rib which is intended to be applied beneath said annular projection of the neck of the container, wherein the rib of the ring extends over less than one-half the circumference of the ring and at least one bridge having a larger cross-sectional area than the other bridges is disposed substantially opposite to said rib.

2. Closure cap according to claim 1, wherein said rib of the ring extends substantially between 120° and 160° of the circumference of the ring.

* * * * *